(12) United States Patent
Zhu et al.

(10) Patent No.: US 10,949,085 B2
(45) Date of Patent: Mar. 16, 2021

(54) ELECTRONIC DEVICE

(71) Applicant: Lenovo (Beijing) Co., Ltd., Beijing (CN)

(72) Inventors: Chong Zhu, Beijing (CN); Fenglong He, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/234,234

(22) Filed: Dec. 27, 2018

(65) Prior Publication Data

US 2019/0205029 A1 Jul. 4, 2019

(30) Foreign Application Priority Data

Jan. 2, 2018 (CN) .......................... 201810003895.2

(51) Int. Cl.
| | | |
|---|---|---|
| G06F 3/048 | (2013.01) | |
| G06F 3/0488 | (2013.01) | |
| G06F 3/14 | (2006.01) | |
| G06F 1/16 | (2006.01) | |
| G06F 3/0354 | (2013.01) | |
| G09G 5/14 | (2006.01) | |
| G06F 3/0489 | (2013.01) | |
| G06F 3/0484 | (2013.01) | |

(52) U.S. Cl.
CPC .......... *G06F 3/04886* (2013.01); *G06F 1/169* (2013.01); *G06F 1/1647* (2013.01); *G06F 3/03547* (2013.01); *G06F 3/1423* (2013.01); *G09G 5/14* (2013.01); *G06F 1/1669* (2013.01); *G06F 3/03543* (2013.01); *G06F 3/0489* (2013.01); *G06F 3/04845* (2013.01); *G06F 2203/04804* (2013.01)

(58) Field of Classification Search
None
See application file for complete search history.

(56) References Cited

U.S. PATENT DOCUMENTS

| | | | |
|---|---|---|---|
| 9,019,207 B1* | 4/2015 | Hamburgen | G06F 3/0213 345/163 |
| 2004/0075641 A1 | 4/2004 | Widdowson | |
| 2004/0227724 A1* | 11/2004 | Chang | G06F 1/162 345/156 |
| 2011/0047459 A1* | 2/2011 | Van Der Westhuizen | G06F 3/04883 715/702 |
| 2017/0351537 A1* | 12/2017 | AbiEzzi | G06F 9/452 |

FOREIGN PATENT DOCUMENTS

| | | |
|---|---|---|
| CN | 2891046 Y | 4/2007 |
| CN | 102129312 A | 7/2011 |

* cited by examiner

*Primary Examiner* — Carl Adams
(74) *Attorney, Agent, or Firm* — Anova Law Group, PLLC

(57) ABSTRACT

The present disclosure provides an electronic device including a first part having a first display unit, and a second part coupled to the first part. The second part includes an input device located in a first region adjacent to a coupling region between the first part and the second part, and a second display unit located in a second region away from the coupling region between the first and second parts.

14 Claims, 6 Drawing Sheets

ELECTRONIC DEVICE

CROSS-REFERENCES TO RELATED APPLICATIONS

This application claims priority of Chinese Patent Application No. 201810003895.2, filed on Jan. 2, 2018, the entire contents of which are hereby incorporated by reference.

FIELD OF THE DISCLOSURE

The present disclosure relates to the technical field of an electronic device.

BACKGROUND

Electronic devices are provided with various functions nowadays. Meanwhile, users are demanding more and higher levels of functionality and better appearance of electronic devices. However, current form and functions of notebook computers are homogeneous. There is a need to provide an electronic device to meet various demands of different users.

BRIEF SUMMARY OF THE DISCLOSURE

One aspect of the present disclosure provides an electronic device. The electronic device includes a first part having a first display unit, and a second part coupled to the first part. The second part includes an input device located in a first region adjacent to a coupling region between the first part and the second part, and a second display unit located in a second region away from the coupling region between the first and second parts.

BRIEF DESCRIPTION OF THE DRAWINGS

The following drawings are merely examples for illustrative purposes to facilitate understanding of the present disclosure according to various disclosed embodiments and are not intended to limit the scope of the present disclosure.

DETAILED DESCRIPTION

Embodiments of present disclosure will be described with reference to the accompanying drawings. It should be understood, however, that these descriptions are only examples, rather than limiting the scope of this disclosure. Well-known and/or repetitive functions and structures are not described in detail to avoid unnecessary or superfluous details that would obscure the disclosure.

The terminology used here is intended only to describe specific embodiments, not to restrict the disclosure. The term "include", "including", "comprise", or "comprising" used herein indicates the existence of the feature, step, operation, and/or part, but does not preclude the existence or addition of one or more other characteristics, steps, operations, or parts.

All the terms used herein, including technical and scientific terms, are generally understood by the person skilled in the art, unless otherwise defined. It should be noted that the terminology used here should be interpreted as having a meaning consistent with the context of this specification, and not in an overly rigid manner.

In the case of using the expression "at least one of A, B and C", it should be interpreted according to the meaning of the expression generally understood by those skilled in the art (for example, "systems with at least one of A, B, and C" should include but not be limited to having only A, only B, only C, A and B, A and C, B and C, and/or A and B and C, etc.).

The present disclosure provides an electronic device. For example, the electronic device includes a first part having a first display unit, and a second part coupled to the first part. The second part includes an input device located in a first region adjacent to a coupling region between the first part and the second part, and a second display unit located in a second region away from the coupling region between the first and second parts.

In some embodiments of the present disclosure, an electronic device includes two display units. Display functions may therefore be improved to provide the functional diversity and appearance novelty of the electronic devices due to introduction of the second display unit. The forms and functions of the electronic devices are no longer monotonous, so as to meet different needs of different users.

The following describes the present disclosure in detail with reference to the accompanying drawings.

Figure 1:
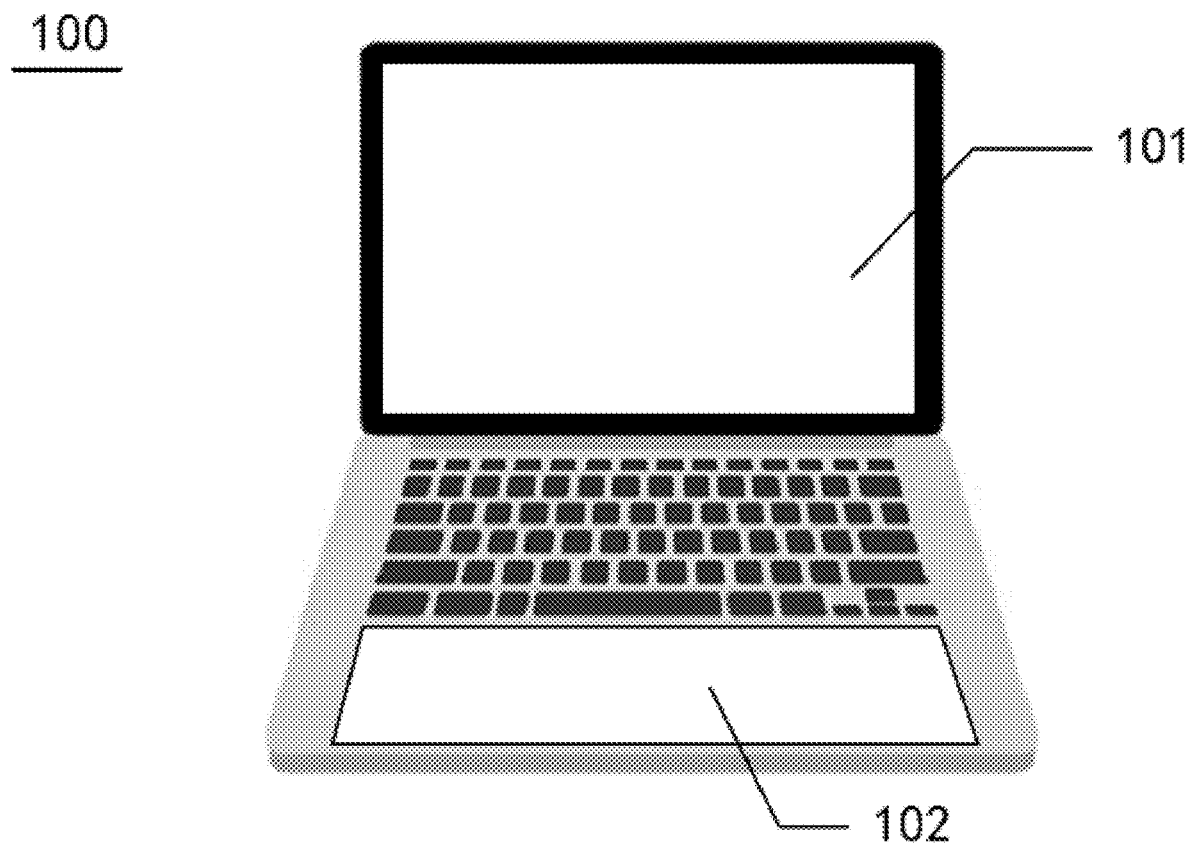
FIG. 1 illustrates an application scenario of an example of an electronic device according to some embodiments of the present disclosure.

FIG. 1 illustrates an example of an application scenario according to some embodiments of the present disclosure.

As illustrated in FIG. 1, the application scenario 100 may include, for example, an electronic device. The electronic device may include, e.g., at least two parts: a first part may include a main display screen of electronic device, and a second part may include an input device for the electronic device and a second display screen.

In some embodiments, the electronic device may be, for example, a notebook computer, or an electronic device having a tablet computer with a removable external keyboard. For example, when the electronic device is a notebook computer, the first part may include a display side of the notebook computer (for example, including a first display screen 101), and the second part may include a system side of the notebook computer. The system side may include a keyboard of the notebook computer and a second display screen 102.

The first display screen 101 and the second display screen 102 can display different contents or display the same content. The first display screen 101 and the second display screen 102 can be in a display state simultaneously. Alternatively, the first display screen 101 and the second display screen 102 can be separately in the display state.

Embodiments of the present disclosure can be illustrated by referencing FIG. 2 to FIG. 6 in conjunction with the application scenario in FIG. 1. It is undertakable that the above application scenario is only an example for understanding the spirit and principle of the present disclosure, without limiting the scope for implementing the present disclosure. On the contrary, embodiments of the present disclosure may be applied to any suitable scenarios.

Figure 2:
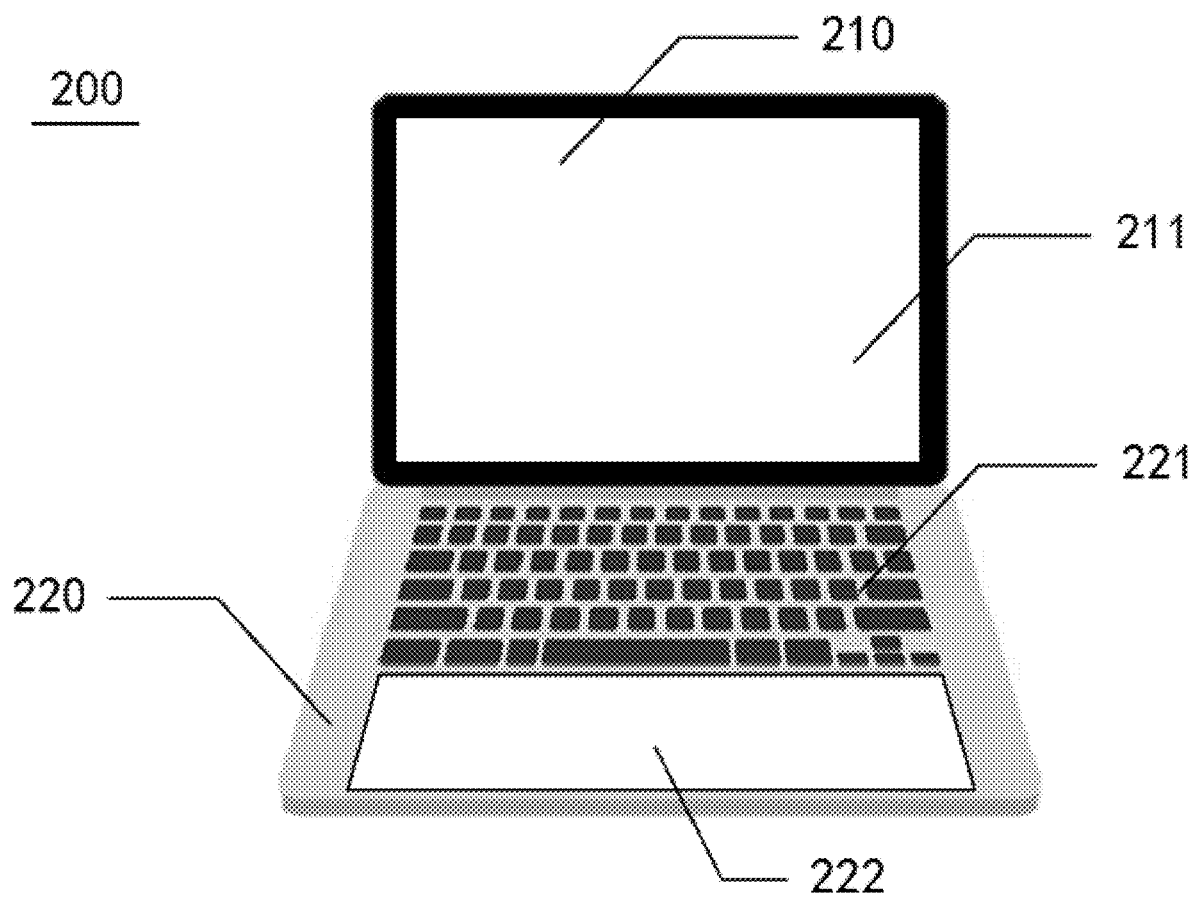
FIG. 2 illustrates a schematic diagram of a display unit of an example of electronic device according to some embodiments of the present disclosure.

FIG. 2 illustrates the schematic diagram of an example of an electronic device in some embodiments of the present disclosure.

As shown in FIG. 2, the electronic device 200 includes a first part 210 and a second part 220. The first part 210 and the second part 220 are rotatably coupled to each other. The first part 210 includes the first display unit 211.

In some embodiments of the present disclosure, the first part 210 of the electronic device 200 may include a portion of the display screen of electronic device. For example, the first part 210 includes the first display unit 211 of the electronic device 200. The first display unit 211 may be the main display screen of the electronic device 200. The second part 220 of electronic device 200, for example, includes the system side of the electronic device 200. The system side of the electronic device 200 can be, for example, the side that includes a keyboard.

The first part 210 is coupled to the second part 220 of the electronic device 200. The first part 210 and the second part 220, for example, can be coupled in a rotatable manner which may be rotated relatively and continuously. For example, the first part 210 and the second part 220 can be coupled through a rotating shaft and can rotate around the rotating shaft to achieve the relative rotation function between the first part 210 and the second part 220. In some embodiments, one of the first and second parts may rotate around the other in a three-dimensional manner, e.g., for about 0 degree to about 360 degrees. In other embodiments, one of the first and second parts may rotate on a side of the other in a three-dimensional manner, e.g., for about 0 degree to about 360 degrees.

In some embodiments of the present disclosure, the first part 210 and the second part 220 can be rotatably and detachably coupled to each other. For example, the first part 210 and the second part 220 can be coupled through a groove. The second part 220 may include the groove. The first part 210 is placed in the groove of the second part 220 and can rotate in the groove to realizes the rotatable coupling function.

It should be understood that the first part 210 and the second part 220 of the electronic device 200 may be coupled in any coupling manner(s) without limitations, as long as the first part 210 and the second part 220 can be rotatably coupled to each other. Any suitable coupling manner(s) may be encompassed within the scope of the present disclosure.

The second part 220 of the electronic device 200 may include a first region and a second region. For example, the second part 220 may include an input device 221 placed in the first region. The first region is located adjacent to a coupling region between the first section 210 and the second part 220, while the second region is located away from the coupling region.

The input device 221 of the second part 220, for example, can be an input device of the electronic device 200. The input device 221, for example, can be a keyboard. The input device 221, for example, can be placed in the first region of the second part 220. The first region, for example, can be a region close to the coupling region between the first part 210 and the second part 220. For example, the first region of the second part 220 can be a part close to the rotation shaft as the first part 210 and the second part 220 of the electronic device are rotatably coupled.

In some embodiments, the second part 220 further includes a second display unit 222, which is placed in a second region of the second part. The second region is away from the coupling region between the first part and the second part.

In some embodiments, the second part 220 of the electronic device may include a second display unit 222. The second display unit 222, for example, can be the second display screen of the electronic device 200. The second display unit 222, for example, can be placed in the second region of the second part 220. The second region, for example, can be a region of the second part 220, away from the coupling region between the first part 210 and the second part 220. For example, the second region of the second part 220 can be away from the rotating shaft when the first part 210 and the second part 220 are rotatably coupled.

The second display unit 222, for example, can act as a secondary display screen of the electronic device 200, together with the first display unit 211 (the main display screen) of the electronic device 200 as the display screens of the electronic device 200.

In some embodiments, the first display unit 211 of electronic device 200 and the second display unit 222, for example, can display at the same time, or either one of them is in the display state. The first display unit 211 and/or the second display unit 222 can be touch screens, and a user can control the display content on the first display unit 211 and/or the second display unit 222 by directly touching the screens.

In some embodiments, the electronic device includes two display units, in which the second display unit, as the secondary display screen of an electronic device, enhances the variation of display functions and appearance novelty of the electronic device so that forms and functions of the electronica device are no longer monotonous, improves the space utilization of the electronic device and provides various choices for the user to meet different desires.

Figure 3:
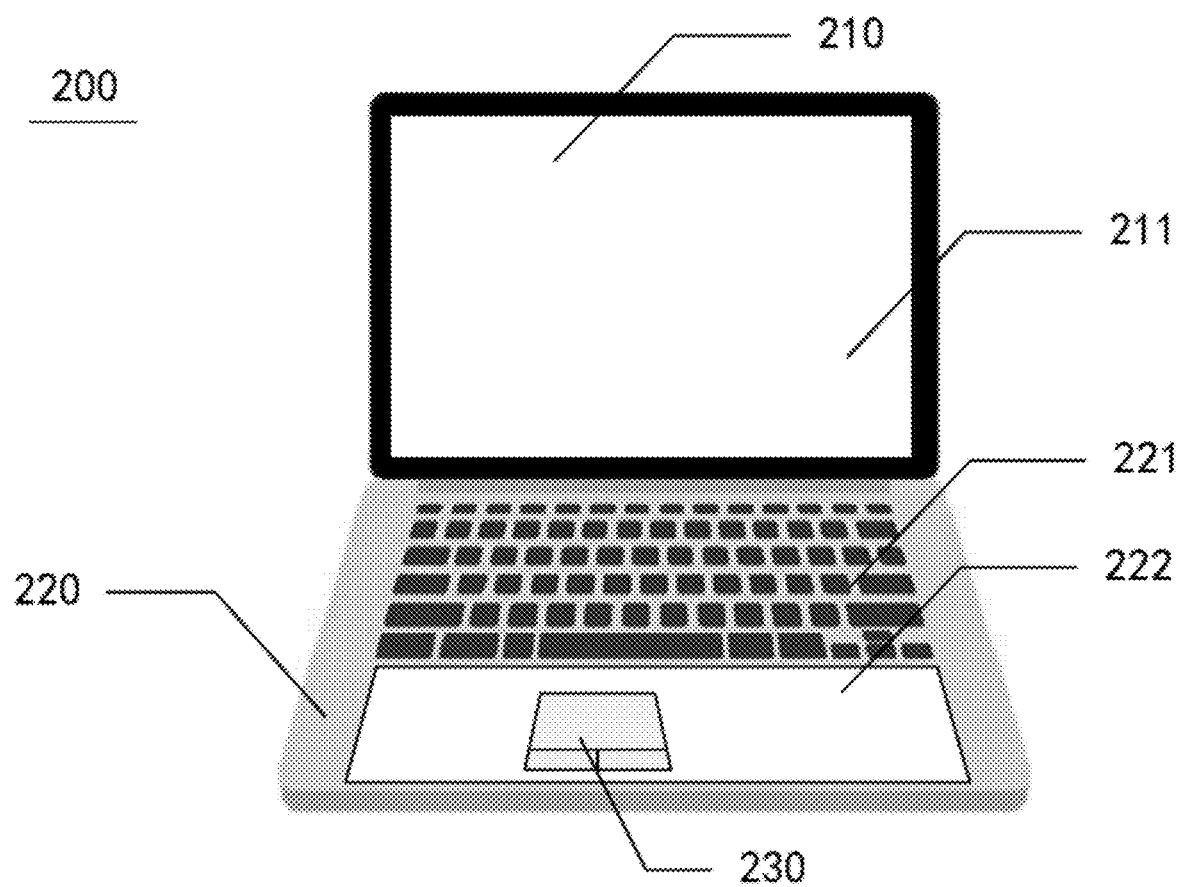
FIG. 3 illustrates a schematic diagram of an example of an electronic device including a virtual touchpad according to some embodiments of the present disclosure.

FIG. 3 illustrates the schematic diagram of an electronic device including a virtual touchpad based on one of some embodiments of the present disclosure.

As shown in FIG. 3, the electronic device further includes a virtual touchpad 230, which includes on and off states, and the virtual touchpad 230 display screens in the second display unit 222 in response to an on state.

The virtual touchpad 230, for example, can includes functions of a mouse. A user can perform certain operations on the electronic devices, for example, by using some touch gestures on the virtual touchpad 230, to manipulate the display on the first display unit 211 of the electronic device 200.

In some embodiments, the virtual touchpad 230, can include a hidden mode in an off state, in which the virtual touchpad does not display on the second display unit. For example, the virtual touchpad 230 can be on a non-viewable and inoperable state, in which the user cannot operate the electronic device through the virtual touchpad 230.

In some embodiments, the virtual touchpad includes an off state in which the virtual touchpad 230 is viewable but inoperable, in which the virtual touchpad 230 is turned off and viewable, but the operation functions of the virtual touchpad 230 is in an off state that would, for example, not respond to any operations. In the viewable but inoperable state, the user, for example, cannot operate the electronic device through the virtual touchpad 230.

In some embodiments, the virtual touchpad 230 displays in the second display unit 222 in an on state. For example, the virtual touchpad 230 in the on state is displayed in a region of the second display unit 222. A user can operate the virtual touchpad 230 by touching operations in the region of the second display unit 222. For example, the user can make a touch gesture on the region of the virtual touchpad 230 in the second display unit 222 to enable the display of electronic device 200, such as controlling the display content on the first display unit 211 of the control electronic device 200.

The electronic device in some embodiments of the present disclosure includes a virtual touchpad, through which the display content of the electronic devices can be operated, so that the virtual touchpad realizes the function of external mouse and achieves the effect of more convenient operation of the electronic device. In addition, the virtual touchpad can be displayed in the second display unit of the electronic device when used, or can be hidden when not in use, which do not need a separate area of the electronic device to place the virtual touchpad. The second display unit can be used as a display screen to display contents. can also be used to display the virtual touchpad, that improves the second display unit utilization. The second display unit of the electronic equipment makes the forms and functions of the electronic device no that longer monotonous, realizes the function diversity and the structure compactness of the electronic device, achieves the effect which can satisfy the user's different demand.

Figure 4:
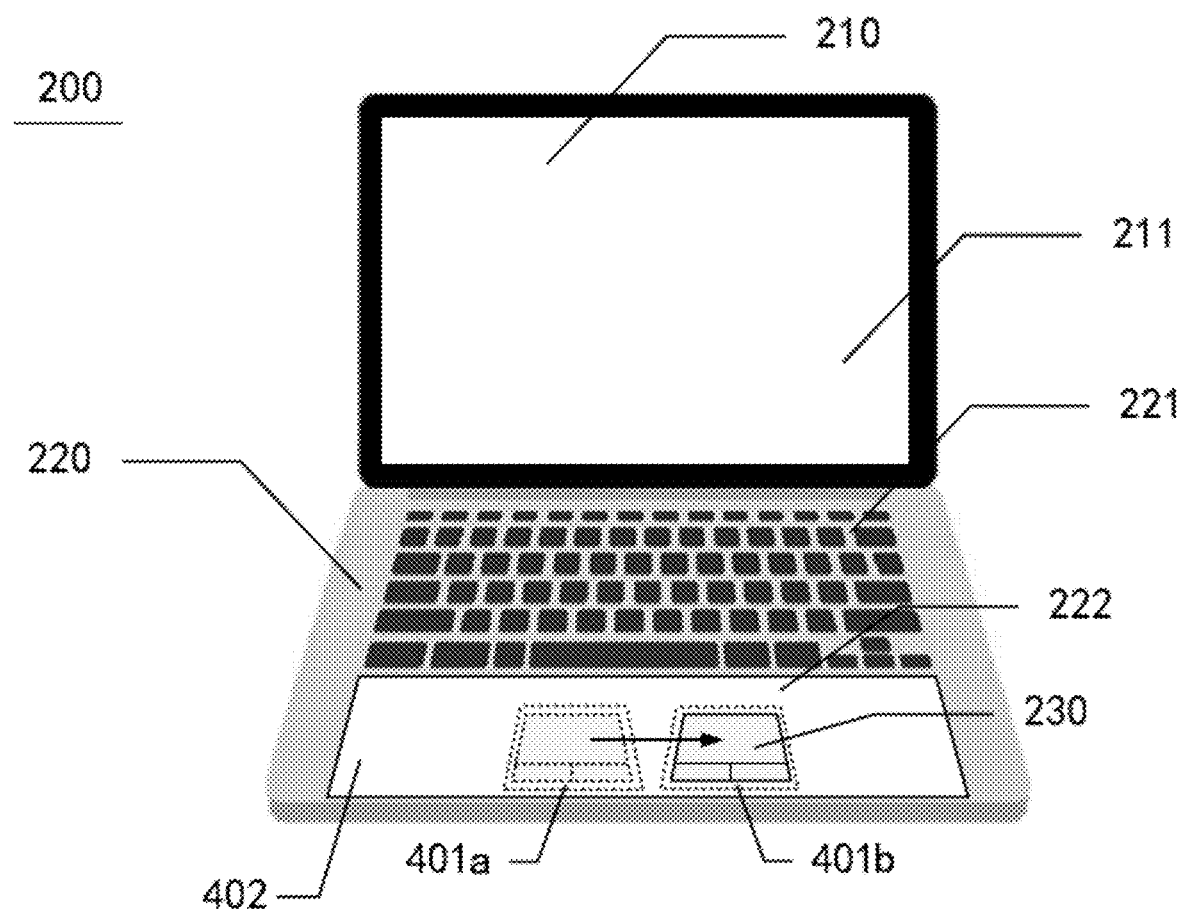
FIG. 4 illustrates a schematic diagram of a movable region in a display of an example of an electronic device according to some embodiments of the present disclosure.
Figure 5:
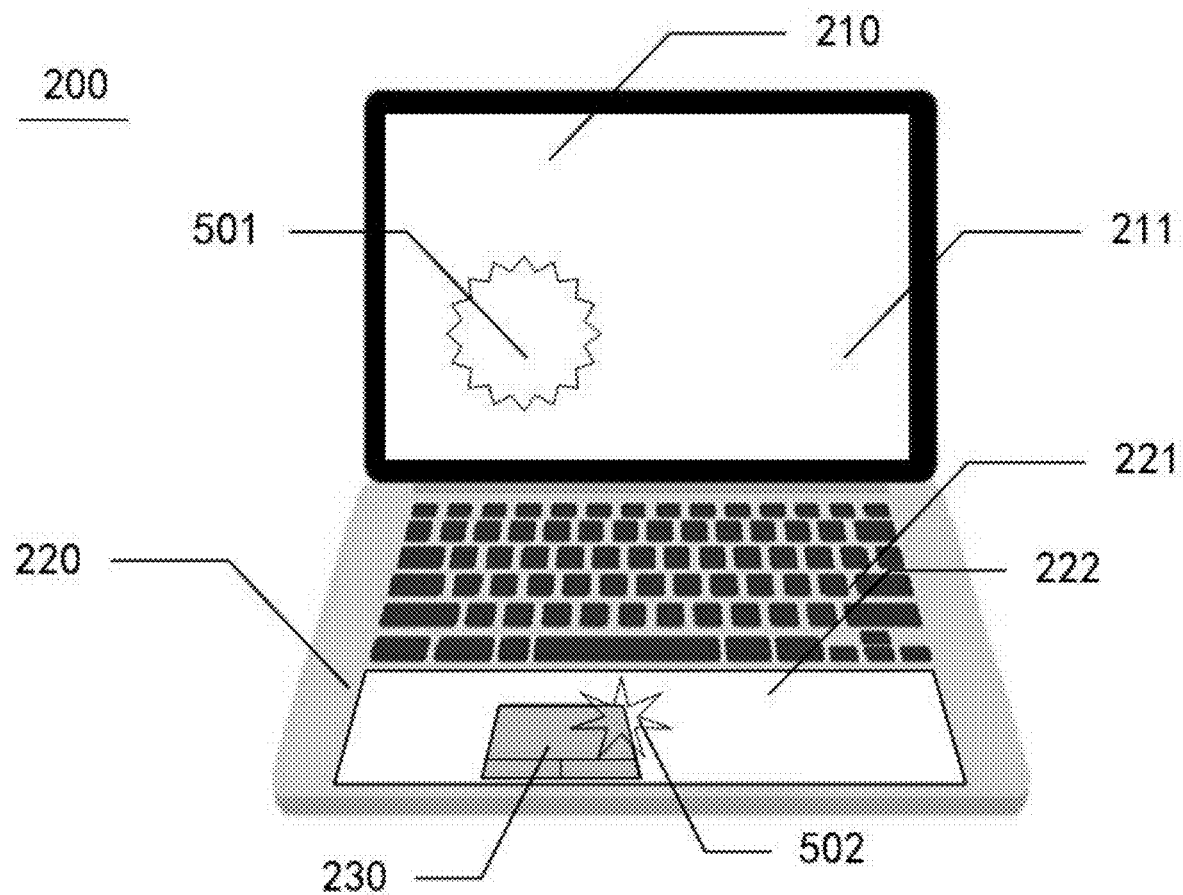
FIG. 5 illustrates a schematic view of display contents of a display screen of an example of an electronic device according to some embodiments of the present disclosure.
Figure 6:
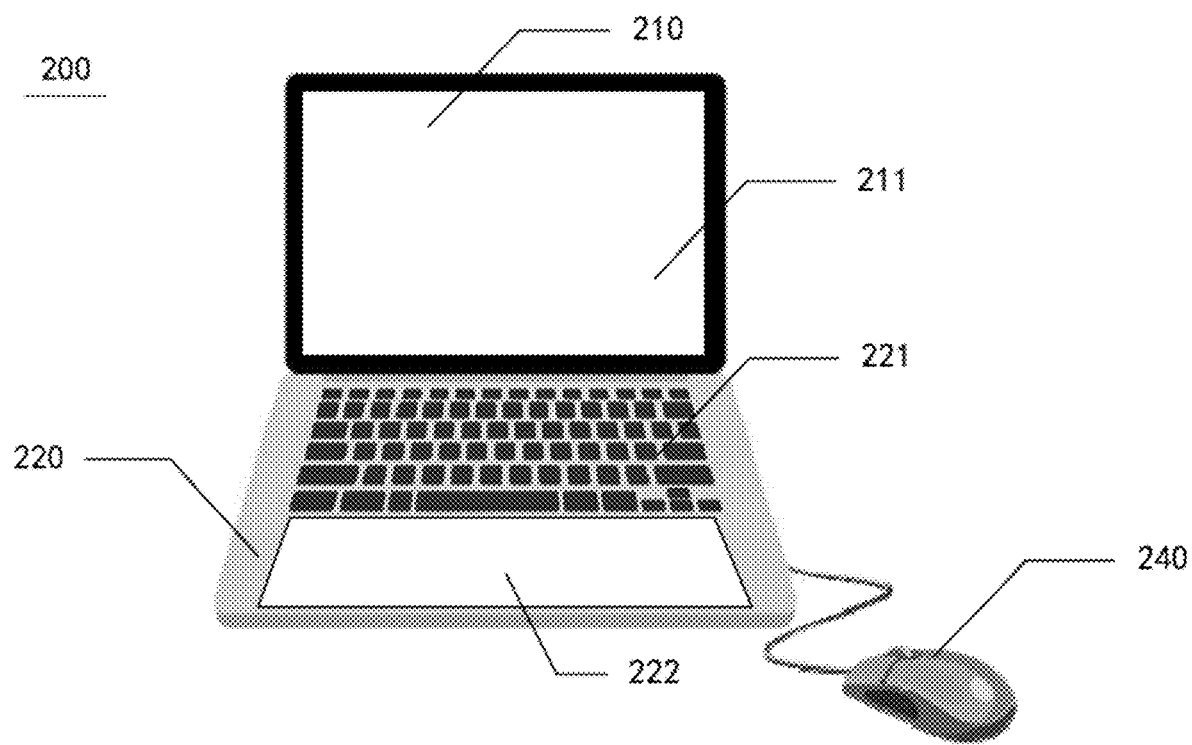
FIG. 6 illustrates a schematic diagram of an external device of an example of electronic device according to some embodiments of the present disclosure.

FIG. 4 to FIG. 6 further illustrate the functionality and structure of the virtual touchpad.

FIG. 4 illustrates the schematic diagram of a movable display region of an electronic device based on some embodiments.

As shown in FIG. 4, a virtual touchpad 230 in an on state, displayed in the second display unit 222, includes: the virtual touchpad 230 is displayed in the third region 401 of the second display unit 222, in which the third region 401 includes a region of the second display unit 222. The third region 401 can move in response to an adjustment instruction on the second display unit 222.

The third region 401 of the second display unit 222 can includes a portion of the display area of the second display unit 222. For example, the second display unit 222 can includes a touchscreen display, in which the third region 401 including a touchscreen area, as illustrated in a dotted area shown in FIG. 4.

The third region 401 can move in response to the adjustment instruction in the second display unit 222. The adjustment instruction can be some touch gestures, such as a sliding gesture, as shown in FIG. 4. The sliding gesture can be, for example, a distance sliding instruction and/or a directional sliding instruction. For example, the starting position of the third area 401 is 401a, and the sliding gesture starting point is located in the third region 401a. The sliding gesture slides a distance (the slide trajectory is shown as an arrow in FIG. 4) from the starting point on the second display unit 222. The third area 401a moves from 401a to 401b in response to the sliding gesture.

In some embodiments, the virtual touchpad 230 is displayed in the third region 401 of the second display unit 222. The virtual touchpad 230 moves along with the third region 401 in response to an adjustment instruction. For example, the third region 401a moves to the third region 401b in response to the adjustment instructions, and the virtual touchpad 230 moves from the third region 401a to the third region 401b as well.

The size of the third region 401 can be adjusted, for example, in response to an adjustment instruction for the size of the third area 401. The adjustment instruction can be, for example, a magnifying gesture, such as an adjustment gesture that can be magnified by multiple fingers on the second display unit 222. The third area 401 can be magnified in response to the magnification adjustment gesture. And the size of the virtual touchpad 230 in the third zone 401 can be magnified accordingly as well.

In some embodiments, the second display unit 222 also includes a fourth region 402, in which the fourth region 402 is different from the third region 401, and in which the third region 401 is used to control the display of the first display unit 211 and the fourth region 402 is used to control the display of the second display unit 222.

In some embodiments, the fourth region 402, differs from the third region 401, includes other areas, excluding the third region 401, of the second display unit 222.

The third region 401 receives an operation to control the display of first display unit 211. The operation received by the third region 401 can be the operation received by the virtual touchpad 230 in the third region 401 by manipulating the virtual touchpad 230, for controlling the display of the first display unit 211 of the electronic device, such as turning off, turning on, adjusting, or editing the display content on the first display unit 211.

In some embodiments, the operation received by the fourth region 402 is used to control the display of the second display unit 222. The fourth region 402 receives the operation to control the display content of the second display screens of the display of unit 222, for example, doing the appropriate action in the fourth region 402, such as turning off, turning on, adjusting, or editing the display content on the second display unit 222.

In some embodiments, the operations of the third region 401 and the fourth region 402 received can be actions of single-clicking, double-clicking, sliding, and so on.

In some embodiments, the display content of first display unit 211 can be the same as or different from the display content of second display unit 222.

The first display unit 211 can display different content or display the same content as that of the second display unit 222. The first display unit 211 and the second display unit 222 can display at the same time, or any one of them is in the display state and the other is in non-display state.

The display contents of the first display unit 211 and the second display unit 222 are not limited, which can be pictures, videos, documents, programs, and so on.

In some embodiments, the second display unit of an electronic device includes a virtual touchpad, which enables the operation of the display contents of the first display unit. The virtual touchpad can include the functions of an external mouse for controlling the operation of electronic device that makes operation of the electronic device more convenient. In addition, controlling other region of the second display unit can be used to control the display content of the second display unit, realizing various functions of the second display unit to meet the user's different needs.

FIG. 5 shows a schematic diagram showing the display of an electronic device display based on some embodiments.

As shown in FIG. 5, the virtual touchpad 230 is displayed in the second display unit in response to an on state, including: the virtual touchpad 230 meets a predetermined degree of transparency in which the display content of the second display unit 222 can be viewed through the virtual touchpad 230.

In some embodiments, the virtual touchpad 230, for example, can be displayed in the second display unit 222 with a degree of transparency. The degree of transparency can be a predetermined condition, such as 50% or 80% of transparency and so on.

In some embodiments, the display content 501 on the first display unit 211 and display content 502 on the first display unit 222 can be the same or different, in which the display contents can be pictures, videos, documents, programs, and so on. A user can view the display content of the second display unit 222 through the virtual touchpad 230, as shown in FIG. 5, when the virtual touchpad 230 meets a certain degree of transparency. The user can view the display content 520 of the second display unit 222 including the portion of the display content 520 covered by the virtual touchpad 230.

The virtual touchpad having a certain degree of transparency on the second display unit can be used to view display content in the second display unit through the virtue touchpad, that provides the electronic device with not only functions of a virtual touchpad, but also minimizing interference on the display functions of the second display unit. The virtual touchpad having a certain degree of transparency device maximizes functions of the virtual touchpad and the second display unit of the electronic device that meets various needs of the users.

FIG. 6 illustrates the schematic diagram of an external device for an electronic device based on some embodiments.

As shown in FIG. 6, the virtual touchpad 230 can switch between the on/off states in response to control instructions.

In some embodiments, a control instruction can include a trigger instruction for turning on or turning off the virtual touchpad 230. The control instructions can be a predetermined instruction of the electronic device during manufacturing, or an instruction set by a user according to the user's desire or usage habits. Control instructions can be generated by pressing a physical key, for example, by pressing the input device 221 (keyboard) on a specified key to turn on or off the virtual touchpad 230. Control instructions can also be generated by touching a touch key of the first display unit or the second display unit when the first display unit or the second display unit is a touchscreen display unit. The virtual touchpad 230 can switch between the on and off states of the virtual touchpad 230 by responding to instructions generated in various ways.

In some embodiments, the on/off state of the virtual touchpad 230 can be switched in response to control instructions, including but not limited to: controlling the virtual touchpad in the off state in response to the access of the electronic device from an external device. The external device includes but not limited to a mouse.

The on and off states of the virtual touchpad, in addition to responding to the above-mentioned control instructions (pressing the physical or virtual touch key), can also be switched by responding to an external device, such as an external keyboard, an external mouse, and so on.

In some embodiments, the virtual touchpad 230 in an off state can respond to an external device. FIG. 6 shows that the external device includes an external mouse 240, and the external mouse can manipulate the display content of the first display unit 211. The functions of the mouse can replace the functions of the virtual touchpad 230, and the virtual touchpad 230 can be turned off. The virtual touchpad 230 can be turned off automatically in response to the external mouse 240.

It should be understood that the virtual touchpad 230 can switch in response to an external device being turned on. For example, when the external device is an external keyboard, the virtual touchpad 230 can switch on in response to the external keyboard in the on state. The external device is not limited to a specific type, and a person skilled of the art can choose other external devices.

In some embodiments, the on/off state of the virtual touchpad can be switched by responding to a current application.

The virtual touchpad 230 can switch on or off by responding to the current application, in which the current application can be a display content of the first display unit 211 or a display content of the second display of unit 222. For example, the current application can be an application of the first display unit 211 or the second display unit 222 for opening/running a picture, video, a document, a program, and so on.

The on/off state of the virtual touchpad 230 can be switched by responding to the current application, including: responding to the current application of a first type to control the virtual touchpad 230 to be in an off state, and responding to the current application of a second type to control the virtual touchpad 230 to be in an on state.

In some embodiments, the current application can include applications such as the first and second type applications, in which the first type of application includes an application for low frequency of user operation on the virtual touchpad 230 and in which the virtual touchpad 230 can be turned off in response to the current first type application. The first type of application can be video, music and other applications, in which the users do not need to act much when using the first type applications (video, music, etc.). The users watch video or listen to music, and the virtual touchpad 230 can be turned off.

In some embodiments, the second type of application includes an application for higher frequency of user operation, in which the second type of application having a high probability to use the virtual touchpad 230 and the virtual touchpad 230 can be turned on in response to the current second type of applications The second type of application can be document editing, picture processing, programming, etc., in which the users using the second type of application (document editing, picture processing, program writing, etc.), have needs for the appropriate action, for example, in the process of editing the document to add, delete, and other actions on the document at any time and the virtual touchpad 230 can be turned on.

The virtual touchpad of the electronic devices can switch automatically by responding to various instructions or applications. The virtual touchpad switches intelligently in an on state when needed, and in an off state when not needed in response to instructions and applications. The virtual touchpad in the off state does not affect the display result of the second display unit. The virtual touchpad intelligent switching mode improves variation of functionality of the electronic device to meet the different needs of various users.

The above embodiments are merely examples of embodiments of the present disclosure and are not intended to limit the scope of the present disclosure. The scope of the present disclosure is defined by the claims. Those skilled in the art can make various modifications or equivalent replacements to the present disclosure within the spirit and scope of the present disclosure, and such modifications or equivalent replacements should also be regarded as falling within the protection scope of the present disclosure.

What is claimed is:
1. An electronic device, comprising:
a first part, comprising a first display unit; and
a second part, coupled to the first part and comprising:
an input device, located in a first region adjacent to a coupling region between the first and second parts;

a second display unit, located in a second region away from the coupling region between the first and second parts; and a virtual touchpad configured to operate a first display content of the first display unit or a second display content of the second display unit, a size of the virtual touchpad increasing in response to a magnification adjustment gesture of a user of the electronic device, wherein the virtual touchpad comprises:

an on state and an off state, wherein in response to the virtual touchpad being displayed on the second display unit in the on state:

the virtual touchpad meets a predetermined degree of transparency to enable the display content of the second display unit to be visible through the virtual touchpad; and the virtual touchpad remains operable for operating the first display content of the first display unit or the second display content of the second display unit;

wherein the input device is an actual keyboard protruding from a surface where the second display unit is located, the actual keyboard remaining in the protruding state.

2. The device according to claim 1, wherein:
the on state and the off state of the virtual touchpad are switchable in response to a control instruction.

3. The device according to claim 2, wherein, in response to an access of an external device, the virtual touchpad is controlled in the off state according to the control instruction.

4. The device according to claim 3, wherein the external device comprises a mouse.

5. The device according to claim 1, wherein the on state and the off state of the virtual touchpad are switchable in response to a current application of the electronic device.

6. The device according to claim 5, wherein, in response to the current application being a first type of application, the virtual touchpad is controlled in the off state.

7. The device according to claim 5, wherein, in response to the current application being a second type of application, the virtual touchpad is controlled in the on state.

8. The device according to claim 1, wherein:
the virtual touchpad in the on state is displayed in a third region of the second display unit,
the third region comprises a partial display region of the second display unit, and
the third region is movable in the second display unit in response to an adjustment instruction.

9. The device according to claim 8, wherein:
the second display unit further includes a fourth region different from the third region,
the third region is configured to receive an operation for controlling a display content of the first display unit, and
the fourth region is configured to receive an operation for controlling a display content of the second display unit.

10. The device according to claim 1, wherein the first display unit and the second display unit display a same content.

11. The device according to claim 1, wherein the first display unit and the second display unit display different contents.

12. The device according to claim 1, wherein the first part and the second part are rotatably coupled to each other.

13. The device according to claim 1, wherein the first part and the second part are coupled together using a rotation shaft.

14. The device according to claim 1, further including:
a notebook computer, wherein the input device includes a keyboard.

* * * * *